Figure 1:
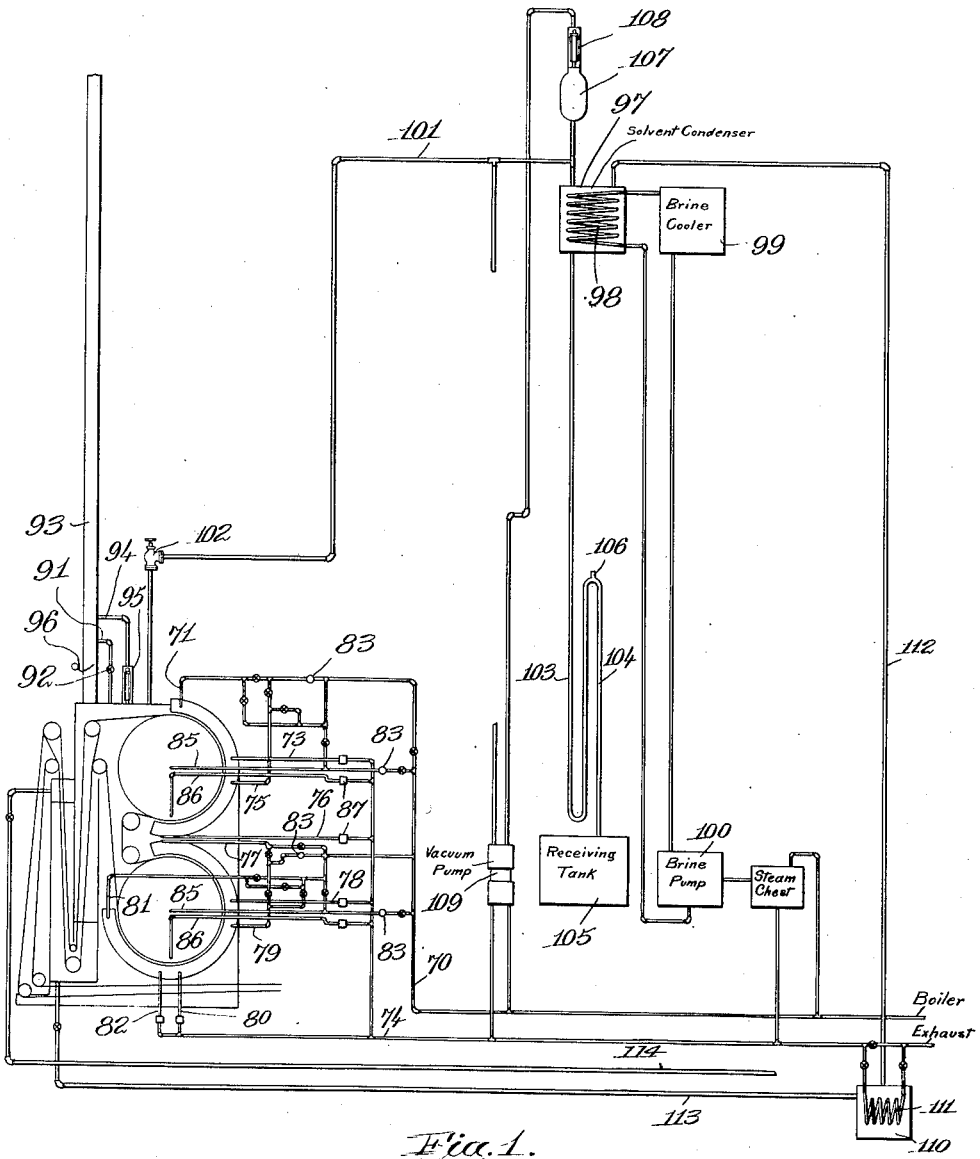

C. F. HOPEWELL.
APPARATUS FOR RECOVERING VOLATILE SOLVENTS.
APPLICATION FILED APR. 17, 1911.

1,063,686.

Patented June 3, 1913.
5 SHEETS—SHEET 1.

C. F. HOPEWELL.
APPARATUS FOR RECOVERING VOLATILE SOLVENTS.
APPLICATION FILED APR. 17, 1911.

1,063,686.

Patented June 3, 1913.
5 SHEETS—SHEET 2.

C. F. HOPEWELL.
APPARATUS FOR RECOVERING VOLATILE SOLVENTS.
APPLICATION FILED APR. 17, 1911.

1,063,686.

Patented June 3, 1913.
5 SHEETS—SHEET 3.

Witnesses.
Thomas J. Drummond
Fred S. Greenhalf

Inventor.
Charles F. Hopewell,
by Edmunds Heard & Smith
Attys.

C. F. HOPEWELL.
APPARATUS FOR RECOVERING VOLATILE SOLVENTS.
APPLICATION FILED APR. 17, 1911.

1,063,686.

Patented June 3, 1913.

5 SHEETS—SHEET 4.

C. F. HOPEWELL.
APPARATUS FOR RECOVERING VOLATILE SOLVENTS.
APPLICATION FILED APR. 17, 1911.
1,063,686.
Patented June 3, 1913.
5 SHEETS—SHEET 5.
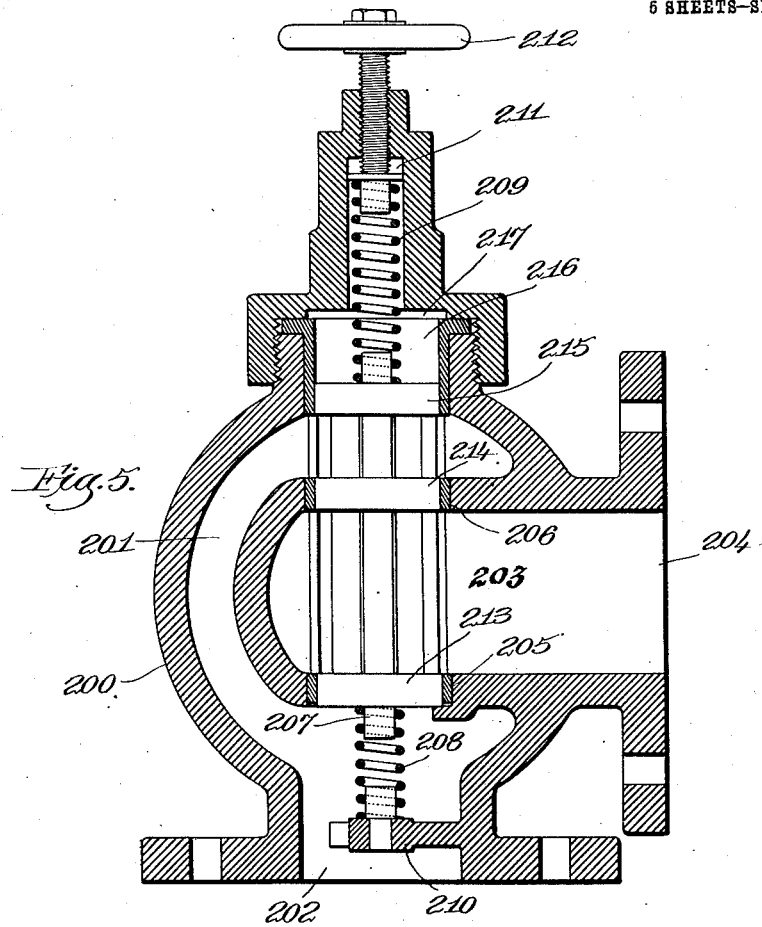
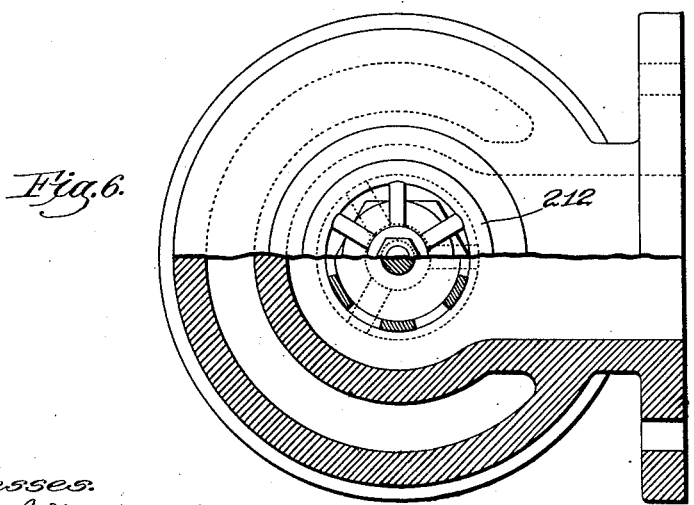
Witnesses:
Thomas J. Drummond
Fred. S. Greenleaf
Inventor:
Charles F. Hopewell,
by Edmonds, Heard & Smith
Attys.

UNITED STATES PATENT OFFICE.

CHARLES F. HOPEWELL, OF NEWTON, MASSACHUSETTS.

APPARATUS FOR RECOVERING VOLATILE SOLVENTS.

1,063,686.  Specification of Letters Patent.  Patented June 3, 1913.

Application filed April 17, 1911. Serial No. 621,576.

*To all whom it may concern:*

Be it known that I, CHARLES F. HOPE-WELL, a citizen of the United States, and resident of Newton, county of Middlesex, and State of Massachusetts, have invented an Improvement in Apparatus for Recovering Volatile Solvents, of which the following description, in connection with the accompanying drawing, is a specification, like characters on the drawing representing like parts.

This invention relates to an apparatus for vaporizing and recovering the volatile solvent or solvents from coated fabrics. Fabrics are coated with various compounds such as rubber compound, linseed oil compound, gun cotton compound, and medicinal compounds for various purposes such as the production of waterproof or adhesive coatings, enamel coatings, artificial leather coatings, and surgical coatings. Such coatings, hereinbefore referred to simply by way of example, contain very considerable quantities of volatile solvents, alcohol, naphtha, amylacetate, and similar substances being among those frequently employed. The " dope " or compound with which the fabric is coated is mixed with the proper solvent or solvents to place it in proper condition for being spread in an even and homogeneous form upon the fabric, but when the coating is dried these solvents are released in the form of vapors and if not recovered are wasted. These solvents are valuable and constitute a large proportion of the cost of the compound with which the fabric is coated. Moreover, such solvents when mixed in air in the proper proportions are highly explosive.

The present invention presents an apparatus by means of which a very large proportion of these solvents may be recovered with the practical elimination of the risk of explosion.

The risk of explosion is eliminated and great economy assured in this invention by the elimination of air from the apparatus during the process of recovery. If air is not present so as to become mixed with the solvent vapors then there is no danger of explosion because it requires a mixture of the air and vapor for that purpose.

If, in the process of recovery of the solvents, air is used, the vapor being mixed with the air and carried therewith through the steps of the process, then there is necessarily great waste of energy. In order to vaporize the solvents not only do the solvents have to be heated but the air, which is usually much greater in volume, must also be heated to the required temperature. Then when the resultant mixture of air and solvent is condensed it is again necessary not only to cool the solvent vapor to the temperature at which it may be recovered in liquid form but it is also necessary to cool to the same temperature the much greater volume of air with which it is commingled. It will thus be seen that the energy required to raise this volume of air to the required temperature to vaporize the solvent and then to lower the same volume of air from the temperature to which it has thus been raised to the temperature required to condense the solvent vapor is entirely wasted. The provision of means by which air is eliminated from the apparatus is, therefore, an important and valuable feature of this invention.

In order to eliminate the air from the apparatus means must be provided for sealing the openings for the admission of the fabric to and its exit from the apparatus so as to prevent the entrance of air or the escape of vapor. As a specific feature of this invention, this sealing is effected by making the admission and exit openings one and locating this opening in liquid, such as water.

The apparatus comprises a vaporizing chamber or box through which the coated fabric passes out of the presence of air and in the presence of heating means by which the vaporization of the solvents is accelerated and secured to the fullest extent.

In order that the process may be performed rapidly and thus economically the coated fabric must be brought to the maximum temperature required for efficient vaporization in as short an interval of time as possible. But it is undesirable to bring the coated fabric to the required temperature at once largely for the reason that vapors of water or solvent will be suddently formed and bursting through the coating will form pin holes or imperfections in its surface. This it will be noted is true whether or not the vaporization be effected in the presence of air. While the present invention is designed particularly to secure the recovery of solvents without the use of air, this feature of the invention is of value even in processes where air is used.

The present invention, therefore, presents means for introducing the freshly coated fabric to successive higher degrees of temperature until the maximum temperature is attained, and in the particular form of apparatus herein illustrated this is secured by the employment of one or more steam heated mangles, successive sections of which are heated to successively and preferably higher degrees of temperature so that the fabric in passing therethrough is gradually brought to the required temperature.

The present invention also provides means for automatically securing the elimination of air from the vaporizing chamber, means for relieving the vaporizing chamber from any dangerous pressure, and various other features and combinations of features, all of which will more fully appear from the accompanying description and drawings, and the novelty of which will be particularly defined by the appended claims.

The drawings show diagrammatically and in detail a preferred form of apparatus embodying the invention. The piping employed in the apparatus is shown chiefly diagrammatically throughout because the details of the connections and the precise positions of the piping is immaterial so long as the arrangement shown diagrammatically is secured.

Figure 2:
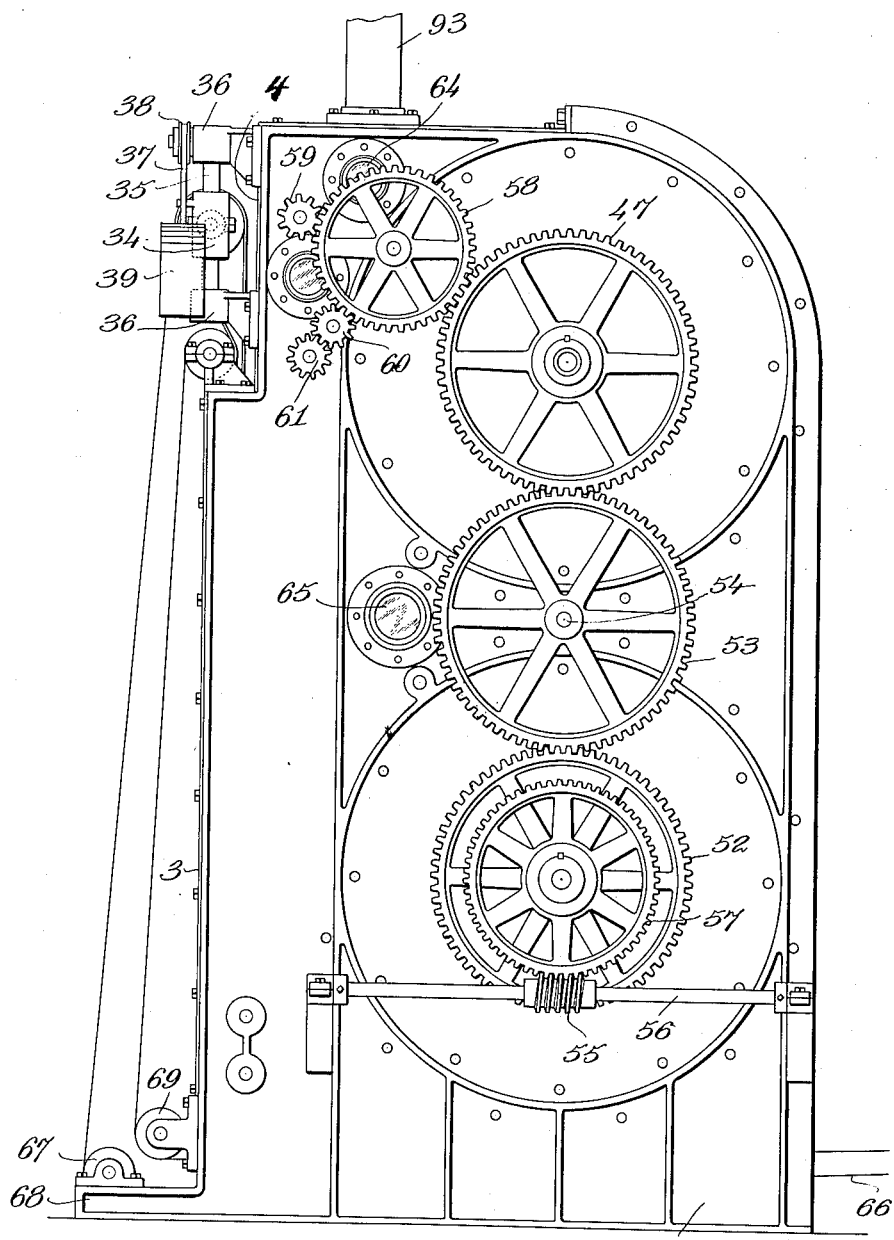
Figure 3:
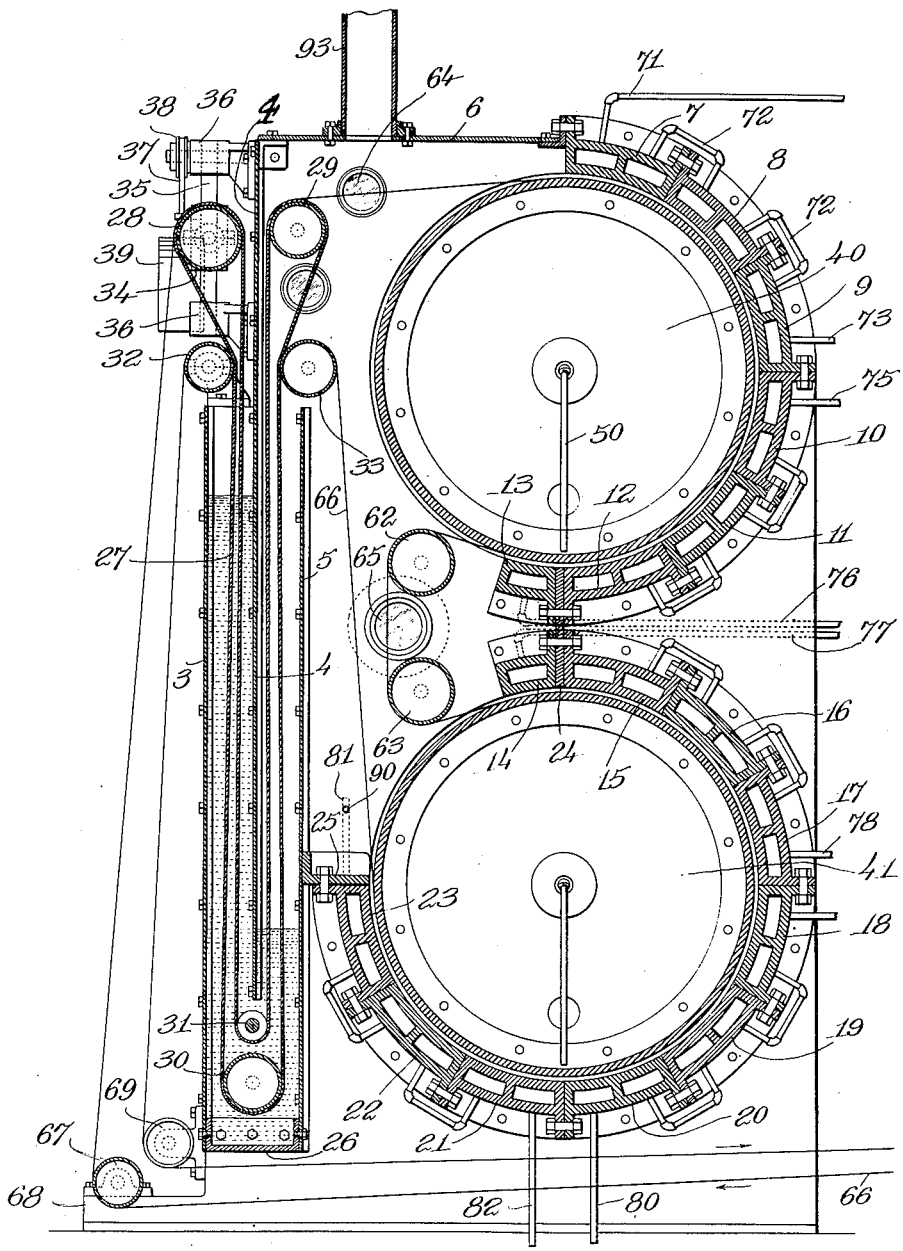
Figure 4:
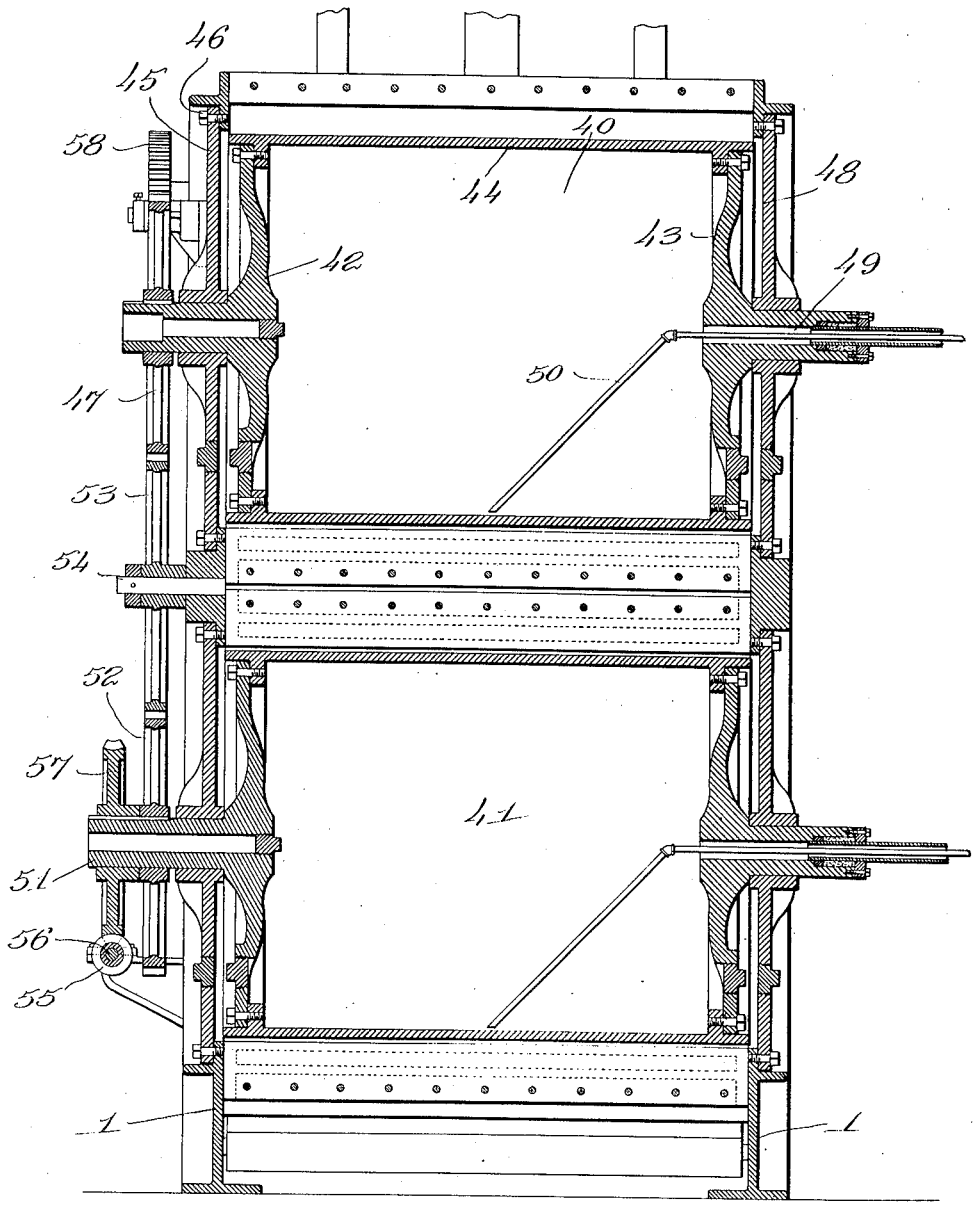

In the drawings, Figure 1 is a side elevation chiefly in diagrammatical form of an apparatus embodying the invention; Fig. 2 is a side elevation of the vaporizing chamber or box; Fig. 3 is a central vertical cross section of the vaporizing chamber or box; Fig. 4 is a transverse vertical cross section of the vaporizing box taken through the axes of the mangles; Fig. 5 is a central vertical cross section of a balanced valve used in the apparatus; Fig. 6 is a top plan, partially in transverse cross section, of said valve.

The vaporizing chamber is shown as heated by steam, and specifically a construction of rotary mangle is illustrated for that purpose, but it is obvious that the particular means employed for heating is not an essential part of the invention, nor is the particular form of device employed essential. It is preferred, however, to employ the steam heated apparatus and to make use of two rotary mangles such as illustrated.

The vaporizing chamber in the construction shown is formed between the connected back plates of the mangles and face plates connected thereto. Vertical ribbed side plates 1 rest upon the floor or suitable support, and are secured together at their forward ends by plates 3, 4 and 5 which will be described in connection with the water seal. At the top the side plates are secured together by a top plate 6. The inclosure of the vaporizing chamber is completed by a series of sectional steam heated mangle back plates 7 to 12 inclusive and 15 to 23 inclusive, the sectional plate 7 being bolted to the top plate 6, the sectional plates 12 and 15 being bolted to the transverse plate 24, the sectional plate 23 being bolted to the transverse bracket plate 25, secured in turn to the front plate 5, while the flanges of the several sectional plates are bolted together as shown and their ends are secured to the side plates 1. A closed chamber, except for the openings to be described, is therefore formed for the vaporization of the solvents. The coated fabric is led into and out of this chamber through a single opening sealed with a liquid such as water. This opening is provided by the plates 3, 4, and 5 already referred to. These plates are secured at their edges to the side plates 1, and the plates 3 and 5 extend up from and are secured to a transverse plate 26, which in turn is secured to the side plates 1, while the plate 4 extends downwardly from the top plate 6 in between the plates 3 and 5, stopping short of the plate 26 so as to leave a space between the plate 26 and its lower edge. Thus there is formed a vertical U-shaped water pocket between the plates 3, 4 and 5 through which the fabric may pass from the exterior to the interior of the vaporizing chamber and vice-versa. This pocket is made of considerable depth because the pressure in the vaporizing chamber will be considerably greater and in some instances might be less than atmospheric pressure and the level of the water in the inner leg of the chamber will necessarily be much lower than that in the outer leg.

In order to keep the back of the coated fabric as dry as possible a backing belt is provided with which the back of the coated fabric is maintained in contact during its passage back and forth through the water seal. Such a backing belt is shown at 27 and is guided about rollers 28, 29, 30 and 31. Other rollers 32 and 33 pressing against the exterior runs of the backing belt serve to maintain its course in the water seal and aid in propelling it. The backing belt is propelled by rollers 29 and 32 which are positively driven, as will appear in the subsequent description.

The proper tension upon the backing belt and the avoidance of slack therein is secured by the take-up device, of which the roller 28 forms a part. For this purpose the roller 28 is mounted in bearings 34 sliding on vertical rods 35 secured in brackets 36 secured to the front plate 4 of the apparatus. Flexible connectors 37 extend from the bearings 34 over pulleys 38 journaled on the brackets 36 to counterweights 39.

The roller 28 is thus raised by the action of the counterweights 39, takes up any slack in the belt 27 and controls the tension thereof. As illustrated, the counterweights may be varied by adding or subtracting larger or smaller weights as required.

The vaporization of the volatile solvents is secured by the heating apparatus already partially described. The fabric in its travel passes around a plurality of rotary mangles between the steam heated drums of the mangles and the segmental packing plate already referred to. In the drawings two such drums 40 and 41 are shown and the construction of each is similar, as appears from Fig. 4. The drum 40 is formed of two heads 42 and 43 and a cylinder 44 bolted thereto. The head 42 extends out through bearings in the circular section 45 of the side plate 1, the circular section being bolted in place by bolts 46. The hub of the head 42 has keyed thereto a gear 47. The opposite head 43 extends out through a bearing in another circular section 48 of the opposite side plate 1 and the hub of this head 43 is axially apertured throughout, as shown at 49, and this aperture forms the steam inlet to the interior of the drum. An exhaust pipe 50 extends through the center of the aperture 49 and forms the outlet for the steam from the interior of the drum. The construction of the drum 41 is similar to that of the drum 40. The hub 51 of the drum 41 has keyed thereto a gear 52 which drives the gear 47 by means of an intermediate gear 53 journaled on the shaft 54, while the hub 51 is driven directly from any suitable source of power by the worm 55 mounted on the transverse shaft 56 engaging the worm wheel 57 keyed to the hub 51.

The rollers 29 and 33, previously described, are positively driven from the gear 47 by an intermediate gear 58 which intermeshes directly with a gear 59 on the shaft of the roll 29 and through the pinion 60 with the gear 61 on the shaft of the roller 33. Suitable idler rolls 62 and 63 are mounted between the mangle drums 40 and 41 for transferring the fabric from the former to the latter. Windows 64 and 65 are provided at convenient points for inspecting the interior of the vaporizing chamber from without and any suitable means may be employed if desired for lighting the interior of the vaporizing chamber.

The fabric is indicated at 66 as coming from the spreader after proper inspection, and is shown as passing with its back against an idler roll 67 journaled in projections 68 from the base of the front plate 1. From this roll it passes up over the roll 28 where it comes in contact with the backing belt with which it remains in contact as it passes down through the water seal and up over the roller 29 to the mangles. When the fabric enters the vaporizing chamber it is usually freshly coated and until it reaches the mangle the only point at which its face is liable to contact with any surface is at the location of the roller 31. This roller may run only to the edges of the backing belt and not touch the coated fabric if desired. In any event, the rollers 29 and 33 being positively driven there is no tendency to stretch the fabric or place tension thereon so as to produce any substantial pressure of the roller 31 upon the fabric. Again the water with which the roller 31 is surrounded if it extends across the fabric will prevent its adherence to or damage of the coated surface of the fabric.

From the roller 29 the fabric passes to the mangles, running around the drums 40 and 41, being transferred from one to the other by the idler rollers 62 and 63. From the mangles the fabric passes to the roller 33 where it again comes in contact with the backing belt 27, passes through the water seal back over the roller 32 down to an idler roller 69 journaled at the bottom of the machine, and thence away from the apparatus. Live steam is connected to the several segmental sections of the backing plates of the mangle drums and circulates therethrough by a system of piping such as illustrated more or less diagrammatically in the drawings.

As before stated, if the coated fabric be suddenly brought to a high degree of temperature, the water and solvent suddenly turning into vapor bursts through the coating, forming pin holes and imperfections therein. In the present construction, therefore, the heating apparatus is arranged so that successive sections thereof reached by the fabric in its travel are at successively different degrees of temperature.

In the construction shown, the live steam pipe coming from the boiler is indicated at 70 and extends at 71 to the segmental back plate section 7. The segmental back plate sections 7, 8 and 9 are connected together by pipes 72, and the section 9 is connected by the pipe 73 with the exhaust pipe 74. A branch 75 of the live steam pipe extends to the segmental back plate section 10. The sections 10, 11, 12, and 13 are connected together by the pipes illustrated, and a pipe 76 extends from the last section 13 to the exhaust 74. A pipe 77 extends from the live steam pipe to the segmental back plate section 14. The sections 14, 15, 16 and 17 are connected together by piping as shown and a pipe 78 extends from the last section 17 to the exhaust 74. A pipe 79 extends from the live steam pipe to the segmental back plate section 18. The sections 18, 19, and 20 are connected together by piping as shown, and a pipe 80 extends from the last section 20 to the exhaust 74. A pipe 81 extends from the live steam pipe to the segmental back plate 23. The sections 23, 22 and 21 are connected together by piping as shown and a pipe 82 extends from the section 21 to the exhaust 74. The drums are heated by the live steam pipes 85 connected to the apertures 49 and pipes 86 extend from the pipes 50 to the exhaust. At suitable points hand valves are provided as illustrated, and also automatic steam regulating valves 83, the latter valves enabling the sections of the heating apparatus controlled thereby to be maintained at desired and different temperatures. Suitable steam traps 87 are provided at required points.

Branch or shunt pipes provided with suitable hand valves are located as illustrated in the system of piping, and a detailed description thereof is unnecessary. As will be seen they enable the live steam to pass either directly or through the automatic regulating valves to the various sections so that by opening and closing various combinations of the hand valves the temperature of the four sections may be varied as desired. This enables the four successive sections illustrated to be maintained at different degrees of temperature according to the conditions which it may be found necessary to comply with in the operation of the apparatus.

With the four automatic steam regulating valves illustrated the four successive sections may be and preferably are maintained at successively higher degrees of temperature and the two drums at any desired temperature, such for example, as that of the first of their respective backing plates. The fabric thus in passing through the mangles comes in juxtaposition to and is thus brought by four temperatures successively increased to the maximum degree of heat. It may be found, however, that other arrangements of the temperature are necessary and the system of piping and the arrangement of automatic regulating valves, hand valves and shunt sections enable any desired degree of temperature to be maintained in the two drums and four backing sections.

When the apparatus is started it is necessary to eliminate the air from the vaporizing chamber and for this purpose an outlet is provided at 90 from the live steam pipe into the chamber. In starting the device this outlet is opened, steam enters the chamber and forces the air through a pipe 91, the valve 92 of which is opened by hand into a flue 93 extending up to the roof. A second pipe 94 connects the vaporizing chamber with the flue and in this pipe a thermostatic air relief valve 95 is located. Any small quantity of air in the vaporizer which collects during the operation of the apparatus, or which is not driven out by the steam in starting, will collect around this valve and cool it. When cooled the valve opens and lets the air out automatically into the flue. As soon as the air passes out through the valve the hot vapor comes in contact with the valve, heats it, and automatically closes it. In this manner any air in the vaporizer is automatically passed out into the flue, preventing the occurrence of any explosive mixture in the vaporizer. The flue 93 is also provided with a check valve 96 beneath the pipes 91 and 93 so that in case of any explosion or undue pressure in the vaporizer this valve will automatically open and provide a vent so that no injury will be done to the apparatus or the building within which it is located, and so that the water in the water seal will not be expelled allowing the escape of the vapor through the admission opening to the chamber.

The coated fabric is fed positively through the vaporizer because it will be noted that the drums and the rollers driving the backing belt are positively driven at uniform peripheral speed so that there is no danger of the fabric being stretched or distorted. The volatile solvents driven off from the coated fabric by the heated mangles collect in the vaporizing chamber in the form of vapor unmixed with air and passes therefrom to the condensing apparatus. This condensing apparatus, which is shown in the drawing in diagrammatic form, is intended to be common to a number of vaporizers. For example, there may be one vaporizer for each strip of fabric being spread, and several of these vaporizers may be piped up to the single condensing apparatus. This condensing apparatus is shown diagrammatically in Fig. 1 because it is not necessary to describe the details of the numerous elements thereof, for these elements are all familiar and well known.

The condenser proper is shown at 97 and should be located well above the vaporizing chamber as, for example, upon the roof of the building. It is shown as containing a coil 98 through which the refrigerating agent is circulated from the cooler 99 by means of the pump 100.

The vaporizer is connected by a pipe 101 with the condenser and a suitable balanced piston valve 102 is located in this pipe near the vaporizer and is so constructed that any increased pressure in the vaporizer will permit the vapor to go through into the condenser and any change in the condensed vapor will have no effect upon the opening and closing function of the valve as that will be controlled entirely by the pressure in the vaporizer itself and independent of any other vaporizer and independent of the condenser pressure. Such a valve is especially valuable where several vaporizers are connected up to a single condensing apparatus because the conditions in the various vaporizers are liable to be quite different. A preferred form of valve for this purpose is illustrated in detail in Figs. 5 and 6. Therein the valve casing 200 is shown as containing two chambers, a chamber 201 opening at 202 to the pipe leading to the vaporizer, and a chamber 203 opening at 204 to the pipe leading to the condenser. These chambers are connected by alined ports 205 and 206. A piston rod 207 is mounted to slide longitudinally of these ports and is seated at opposite ends in the helical springs 208 and 209 respectively. The spring 208 rests on a stud 210, while the spring 209 seats against a head 211 adjustable by the hand screw 212. This piston rod carries three pistons 213, seating in the port 205, 214, seating in the port 206, and 215, seating in a chamber 216 in line with these ports and opening to the atmosphere at 217. It will thus be seen that any pressure entering the valve through the port 204 will act equally against the pistons 213 and 214 and so have no effect to either open or close the valve, while any pressure entering the valve through the chamber 201 while acting equally on the pistons 213 and 214 will act on the piston 215 and so open the valve to the extent allowed by the condition of the spring 209.

The condensed solvents flow by gravity from the condenser into the U-shaped pipe 103, to the upper end of which the overflow pipe 104 is connected and leads into the receiving tank 105. The U-shaped pipe 103 provides a liquid seal against the atmospheric pressure, because the pressure in the condenser will be well under that of the atmosphere. This enables the solvent to flow by gravity over into the overflow pipe 104 and down into the receiving tank, an air outlet 106 being provided to prevent any siphonic action.

An air chamber 107 is mounted above and connected to the condenser 97 and is provided with a thermostatic air relief valve 108 having a similar function to the valve 95 already described, thus allowing any air which has collected in the condensing chamber to be automatically withdrawn therefrom. Since the pressure in the condenser is below that of the atmosphere a vacuum pump 109 is shown connected to the outlet from the valve 108.

The water in the water seal will become more or less impregnated with the solvent vapors, and this invention provides a means for recovering the solvents from the water of the seal. For that purpose a closed tank is shown at 110 containing a steam heated coil 111 and connected by the pipe 112 to the condenser 97. A pipe 113 runs from the lowermost point of the water seal chamber to the tank 110 by means of which when the apparatus is shut down the water in the seal may be withdrawn into the tank 110 and there heated to vaporize any solvent contained therein. The vapor will pass therefrom into the condenser and condense with the vapor from the vaporizer. A pipe 114 is shown by means of which the water seal chamber may be refilled. The condensed solvent received in the tank 105 may be separated into its component liquids by any well known process of fractional distillation.

It will be seen that the apparatus described secures the recovery of the solvents from the coated fabric in a rapid, economical and safe manner, the air being eliminated entirely from the system, and this condition being automatically maintained. The vapor is handled in a substantially pure form without danger of explosion and with the minimum amount of energy for heating and refrigeration. The goods containing the solvent to be reclaimed are also heated by direct conduction instead of by air or other convection, and thus the heat is brought to the goods directly with the minimum loss and in the shortest interval of time, this result being secured largely by the perfect control of the temperature and by heating through successive stages of temperature. The water seal prevents any escape of vapor or admission of air. The check valve in the flue 93 takes care of any abnormal increase in pressure or explosion due to accident, and the water seal itself provides an additional safety valve in the case of any extra abnormal contingency. The fabric being handled by the positively driven rolls running at uniform peripheral speed is not stretched or distorted, and passes from the apparatus in perfect condition. The connection of a plurality of vaporizers to a single condensing apparatus renders the apparatus highly flexible and enables it to be employed in connection with various spreading or coating machines located at different points in the plant.

If it is found of advantage to carry on the process in the presence of moisture the apparatus is so constructed that steam may be sprayed into the vaporizing box to the extent required through the opening 90

It is to be noted that the back or uncoated side of the fabric rests directly upon the mangle drums. The heat thus works from the back of the fabric toward the face which is a more efficient way of expelling the solvent vapors from the coating. The mangle backs are in proximity to the coated face, but do not touch the coating and leave sufficient space for the passage of the vapor and any moisture driven out.

Having fully described my invention what I claim as new and desire to secure by Letters Patent is:

1. An apparatus of the character described comprising a closed vaporizing box provided with an opening for the admission and exit of the fabric, a vertical liquid chamber surrounding the said opening to seal the opening against the passage of air or vapor, means for guiding the fabric back and forth through said opening, a condenser and a connection from the box to the condenser to allow the passage of vapor from the former to the latter.

2. An apparatus of the character described comprising a closed vaporizing box, means for permitting the continuous passage of a strip of fabric into and out of said box sealed against the passage of air or vapor, an air relief passage opening from said box, and a thermostatic air relief valve in said passage.

3. An apparatus of the character described comprising a closed vaporizing box, means for permitting the continuous passage of a strip of fabric into and out of said box sealed against the passage of air or vapor, means for admitting steam to said box to drive the initially inclosed air out, and a valve controlled exit passage from said box to allow the escape of the air.

4. An apparatus of the character described comprising a closed vaporizing box, means for permitting the continuous passage of a strip of fabric into and out of said box sealed against the passage of air or vapor, means for admitting steam to said box to drive the initially inclosed air out, a valve controlled exit passage from said box to allow the escape of the air, an air relief passage opening from said box, and a thermostatic air relief valve in said passage.

5. An apparatus of the character described comprising a closed vaporizing box, means for permitting the continuous passage of a strip of fabric into and out of said box sealed against the passage of air or vapor, heating means within said box, a condenser, a connection from the box to the condenser to allow the passage of vapor from the former to the latter, means for automatically eliminating air from the said apparatus while in operation.

6. An apparatus of the character described comprising a closed vaporizing box, means for permitting the continuous passage of a strip of fabric into and out of said box sealed against the passage of air or vapor, an air relief passage opening from said box, a thermostatic air relief valve in said passage, a condenser, a connection from said box to said condenser to allow the passage of vapor from the former to the latter, an air chamber connected to the condenser, a thermostatic air relief valve connected to said air chamber, and means for producing a vacuum connected to the exit from said thermostatic air relief valve.

7. An apparatus of the character described comprising a closed vaporizing box provided with an opening for the admission and exit of the fabric, a vertical liquid chamber surrounding the said opening to seal the opening against the passage of air or vapor, an endless backing belt, rolls for the belt extending through the said vertical chamber to the said opening between a position within and a position without said box, means for driving said endless belt, and means for guiding the fabric back and forth through said opening with its back in contact with said belt.

8. An apparatus of the character described comprising a closed vaporizing box, heating means located within said box, means for permitting the continuous passage of a strip of fabric into and out of said box sealed against the passage of air or vapor, means for guiding said fabric within said box in proximity to said heating means, a condenser, a connection from the box to the condenser to allow the passage of vapor from the former to the latter, and means for removing the condensed products from the condenser.

9. An apparatus of the character described comprising a closed vaporizing box, heating means located within said box, means for maintaining successive sections of said heating means at successively different temperatures, means for permitting the continuous passage of a strip of fabric into and out of said box sealed against the passage of air or vapor, and means for guiding said fabric within said box in proximity to said heating means.

10. An apparatus of the character described comprising a closed vaporizing box, means for permitting the continuous passage of a strip of fabric into and out of said box sealed against the passage of air or vapor, a condenser, connections between said box and said condenser to allow the passage of vapor from the former to the latter, a rotary heated mangle located within said box, and means for guiding the fabric through said mangle.

11. An apparatus of the character described comprising a closed vaporizing box, means for permitting the continuous passage of a strip of fabric into and out of said box sealed against the passage of air or vapor, a condenser, connections between said box and said condenser to allow the passage of vapor from the former to the latter, a plurality of rotary heated mangles within said box, means for guiding the fabric through said mangles successively.

12. An apparatus of the character described comprising a closed vaporizing box, means for permitting the continuous passage of a strip of fabric into and out of said box sealed against the passage of air or vapor, a condenser, connections between said box and said condenser to allow the passage of vapor from the former to the latter, a plurality of rotary heated mangles within said box, means for maintaining successive sections of said mangles at successively different temperatures, and means for guiding the fabric through said mangles successively.

13. An apparatus of the character described comprising a closed vaporizing box, heating means located within said box, means for guiding the fabric into and out of said box, and in proximity to said heating means, a condenser, a connection between said box and said condenser, and a piston-operated valve balanced for back pressure located in said connection.

14. An apparatus of the character described comprising a closed vaporizing box provided with an opening for the admission and exit of the fabric, a vertical liquid chamber surrounding the said opening to seal the opening against the passage of air or vapor, a condenser, a connection between said box and said condenser to allow the passage of vapor from the former to the latter, a heated tank, a connection between said tank and said condenser, and a connection between said vertical chamber and the said tank whereby the liquid may be drawn off from the former to the latter to allow the vaporization of solvents absorbed in said liquid and the discharge of the vapor into the condenser.

15. In apparatus of the character described comprising a closed vaporizing box, means for permitting a continuous passage of a strip of fabric into and out of said box, heating means located within said box, means for maintaining successive sections of said heating means at successively different temperatures, means for guiding said fabric within said box in proximity to said heating means.

16. In apparatus of the character described comprising a closed vaporizing box, means for permitting a continuous passage of a strip of fabric into and out of said box, heating means located within said box, means for maintaining successive sections of said heating means at successively higher temperatures, means for guiding said fabric within said box in proximity to said heating means.

17. In apparatus of the character described comprising a closed vaporizing box, means for permitting a continuous passage of a strip of fabric into and out of said box, a rotary heated mangle located in said box, means for guiding the fabric through said mangle, and means for maintaining successive sections of said mangle at successively different temperatures.

18. In apparatus of the character described comprising a closed vaporizing box, means for permitting a continuous passage of a strip of fabric into and out of said box, a rotary heated mangle located in said box, means for guiding the fabric through said mangle, and means for maintaining successive sections of said mangle at successively higher temperatures.

19. In apparatus of the character described comprising a closed vaporizing box, means for permitting a continuous passage of a strip of fabric into and out of said box, a plurality of rotary heated mangles within said box, means for maintaining successive sections of said mangles at successively higher temperatures, and means for guiding the fabric through said mangles successively.

20. In apparatus of the character described comprising a closed vaporizing box, means for permitting a continuous passage of a strip of fabric into and out of said box, heating means located within said box, means for guiding said fabric within said box in proximity to said heating means, a condenser, connections between said box and said condenser to allow the passage of vapor from the former to the latter, and means for automatically eliminating air from said condenser.

21. In apparatus of the character described comprising a closed vaporizing box, means for permitting a continuous passage of a strip of fabric into and out of said box, heating means located within said box, means for guiding said fabric within said box in proximity to said heating means, a condenser, connections between said box and said condenser to allow the passage of vapor from the former to the latter, a piston operated valve balanced for back pressure located in said connection, and means for automatically eliminating air from said condenser.

22. An apparatus of the character described comprising a closed vaporizing box, means for permitting the continuous passage of a strip of fabric into and out of said box sealed against the passage of air or vapor, heating means within said box, means for guiding said fabric within said box in proximity to said heating means, a condenser, connections between said box and said condenser to allow the passage of vapor from the former to the latter and means for automatically removing the condensed products from the condenser.

23. An apparatus of the character described comprising a closed vaporizing box, means for permitting the continuous passage of a strip of fabric into and out of said box sealed against the passage of air or vapor, heating means within said box, means for guiding said fabric within said box in proximity to said heating means, a condenser, connections between said box and said condenser to allow the passage of vapor from the former to the latter, an air chamber connected to the condenser, and a thermostatic air relief valve connected to said air chamber.

24. An apparatus of the character described comprising a closed vaporizing box, means for permitting the continuous passage of a strip of fabric into and out of said box sealed against the passage of air or vapor, a rotary heated mangle located in said box, means for guiding the fabric through said mangle, a condenser, connections between said box and said condenser to allow the passage of vapor from the former to the latter, an air chamber connected to the condenser, and a thermostatic air relief valve connected to said air chamber.

25. An apparatus of the character described comprising a closed vaporizing box, means for permitting the continuous passage of a strip of fabric into and out of said box sealed against the passage of air or vapor, heating means within said box, means for maintaining successive sections of said heating means at successively different temperatures, means for guiding said fabric within said box in proximity to said heating means, a condenser, and connections between said box and said condenser to allow the passage of vapor from the former to the latter.

26. An apparatus of the character described comprising a closed vaporizing box, means for permitting the continuous passage of a strip of fabric into and out of said box sealed against the passage of air or vapor, heating means within said box, means for guiding said fabric within said box in proximity to said heating means, a condenser, connection between said box and said condenser to allow the passage of vapor from the former to the latter, and means for automatically and continuously removing the condensed products from the condenser.

27. An apparatus of the character described comprising a closed vaporizing box, means for permitting the continuous passage of a strip of fabric into and out of said box sealed against the passage of air or vapor, heating means within said box, means for maintaining successive sections of said heating means at successively different temperatures, means for guiding said fabric within said box in proximity to said heating means, a condenser, connections between said box and said condenser to allow the passage of vapor from the former to the latter, an air chamber connected to the condenser, and a thermostatic air relief valve connected to said air chamber.

28. An apparatus of the character described comprising a closed vaporizing box provided with an opening for the passage of the fabric, a vertical liquid chamber surrounding said opening to seal the opening against the passage of air or vapor, heating means located within said box, means for guiding said fabric within said box in proximity to said heating means, a condenser and connection from the box to the condenser to allow the passage of vapor from the former to the latter, and means for removing the condensed products from the condenser.

29. An apparatus of the character described comprising a closed vaporizing box provided with an opening for the passage of the fabric, a vertical liquid chamber surrounding said opening to seal the opening against the passage of air or vapor, heating means located within said box, and means for guiding said fabric within said box in proximity to said heating means.

30. An apparatus of the character described comprising a closed vaporizing box provided with an opening for the passage of the fabric, a vertical liquid chamber surrounding said opening to seal the opening against the passage of air or vapor, a condenser, connection between said box and said condenser to allow the passage of vapor from the former to the latter, a rotary heated mangle located within said box, and means for guiding the fabric through said mangle.

31. An apparatus of the character described comprising a closed vaporizing box provided with an opening for the passage of the fabric, a vertical liquid chamber surrounding said opening to seal the opening against the passage of air or vapor, a condenser, connection between said box and said condenser to allow the passage of vapor from the former to the latter, a plurality of rotary heated mangles, and means for guiding the fabric successively through said mangles.

32. An apparatus of the character described comprising a closed vaporizing box provided with an opening for the passage of the fabric, a vertical liquid chamber surrounding said opening to seal the opening against the passage of air or vapor, heating means within said box, means for guiding said fabric within said box in proximity to said heating means, a condenser, connection between said box and said condenser to allow the passage of vapor from the former to the latter, and means for automatically removing the condensed products from the condenser.

33. An apparatus of the character described comprising a closed vaporizing box provided with an opening for the passage of the fabric, a vertical liquid chamber surrounding said opening to seal the opening against the passage of air or vapor, heating means within said box, means for guiding said fabric within said box in proximity to said heating means, a condenser, connection between said box and said condenser to allow the passage of vapor from the former to the latter, and means for automatically and continuously removing the condensed products from the condenser.

In testimony whereof, I have signed my name to this specification, in the presence of two subscribing witnesses.

CHARLES F. HOPEWELL.

Witnesses:
 NATHAN HEARD,
 THOMAS J. DRUMMOND.